United States Patent [19]

Someya

[11] 4,381,892
[45] May 3, 1983

[54] WAIST LEVEL VIEWFINDER

[75] Inventor: Hiromi Someya, Kawasaki, Japan

[73] Assignee: Canon Kabushiki Kaisha, Tokyo, Japan

[21] Appl. No.: 319,957

[22] Filed: Nov. 10, 1981

[30] Foreign Application Priority Data

Nov. 13, 1980 [JP] Japan .......................... 55-162245[U]
Feb. 9, 1981 [JP] Japan ................................ 56-17825

[51] Int. Cl.³ ............................................ G03B 11/04
[52] U.S. Cl. .................................... 354/287; 354/219
[58] Field of Search ........................ 354/155, 199-201, 354/219, 223, 287; 352/171; 350/57

[56] References Cited

U.S. PATENT DOCUMENTS

| 1,573,401 | 2/1926 | Heine | 354/155 |
| 2,054,442 | 9/1936 | Percy | 354/219 |
| 3,007,386 | 11/1961 | Biermeier | 354/287 |
| 3,630,135 | 12/1971 | Sato | |

FOREIGN PATENT DOCUMENTS

| 1127202 | 4/1962 | Fed. Rep. of Germany | 354/155 |
| 479885 | 11/1969 | Switzerland | 354/219 |

Primary Examiner—John Gonzales
Attorney, Agent, or Firm—Toren, McGeady and Stanger

[57] ABSTRACT

A waist level viewfinder for a camera arranged to permit direct observation from above a focusing plate of the image of an object formed on the focusing plate. The viewfinder includes a first light shielding tubular member which is attachable to and detachable from the camera and a second light shielding tubular member which is slidable relative to the first tubular member and which is provided with an eyepiece. The eyepiece is pivotally mounted so as to be capable of being retracted out of the viewing path of the reticle plate. The viewfinder is thus arranged to provide improved light shielding characteristics when it is in use and to have improved portability when not in use while also facilitating diopter correction.

7 Claims, 6 Drawing Figures

WAIST LEVEL VIEWFINDER

The present invention relates to photographic equipment and more specifically to a waist level viewfinder for a single lens reflex camera.

Waist level viewfinders of the type arranged to permit direct observation of the image of an object to be photographed which is formed on a focusing plate from above the focusing plate have been known in the art. However, conventional waist level viewfinders are usually composed of a hood which is arranged to be folded when the viewfinder is not in use. Therefore, in conventional viewfinders of this type, it has been found impossible to provide a sufficient distance between the focusing plate and the upper end face of the light shielding part thereof in order to secure good light shielding characteristics.

In addition to this drawback, the conventional viewfinder of this type involves another disadvantage in that the image of the object to be photographed which is formed on the focusing plate is not easily observable due to conversely incident light from the upper end of the light shielding member. A further drawback of conventional viewfinders of this type is that, in the case of a camera having a light measuring mechanism disposed in the viewfinder optical system, the light measurement tends to exhibit errors.

In determining the composition of a photograph of the object which is imaged on the focusing plate with a waist level viewfinder of the type discussed, this composition is determined directly by observing the image of the object. Then, in determining focal length, a focusing operation is effected generally by observation of an enlarged image on the reticle plate through a magnifying lens which is normally provided in the light shielding portions of the viewfinder. However, in the case of conventional waist level viewfinders, it has been found impossible to alter the distance between the focusing plate and the magnifying lens while the latter is in use. Therefore, it is impossible to correct diopter while the magnifying lens is in its operative position. This has been found to cause an additional problem.

Accordingly, the present invention is directed toward providing a structure for a viewfinder dealing with the aforementioned problems and more particularly with a waist level viewfinder wherein a light shielding mechanism formed by a plurality of slidable tubes arranged to provide excellent portability and excellent light shielding effects are arranged to enable operation of the viewfinder with a magnifying lens without interfering with diopter correction.

SUMMARY OF THE INVENTION

Briefly, the present invention may be described as a viewfinder for a camera including a focusing plate adapted to permit from above the focusing plate direct observation on the focusing plate of an image of an object to be photographed comprising a first and a second tubular light shielding member defining a viewing path through which the focusing plate may be viewed, eyepiece means mounted on one of the first and second tubular members along the viewing path, said tubular members being mounted in generally concentric relationship and being adapted to be moved relative to each other, and pivot means for enabling the eyepiece means to be pivoted out of the viewing path in a retracted position to enable an image on the focusing plate to be viewed directly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
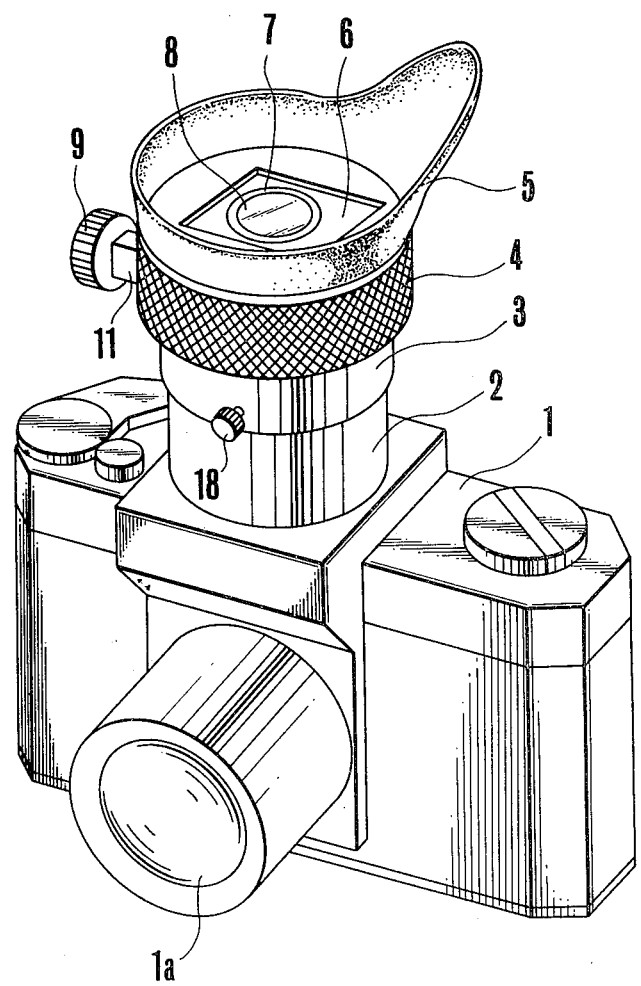
FIG. 1 is a perspective view showing a camera with a waist level viewfinder of the type to which the present invention relates.

FIG. 1 shows an overall assembly of a camera with a waist level viewfinder of the type to which the present invention relates wherein the viewfinder comprises first and second light shielding tubular members 2 and 3, the first light shielding member 2 having a lower end thereof arranged to be attachable to and detachable from a camera body 1. The second light shielding member 3 is slidably fitted on the first light shielding member 2. On the outer circumferential face of the second member 3 there is provided a knurled part 4 to enable firm gripping of the equipment.

Figure 2:
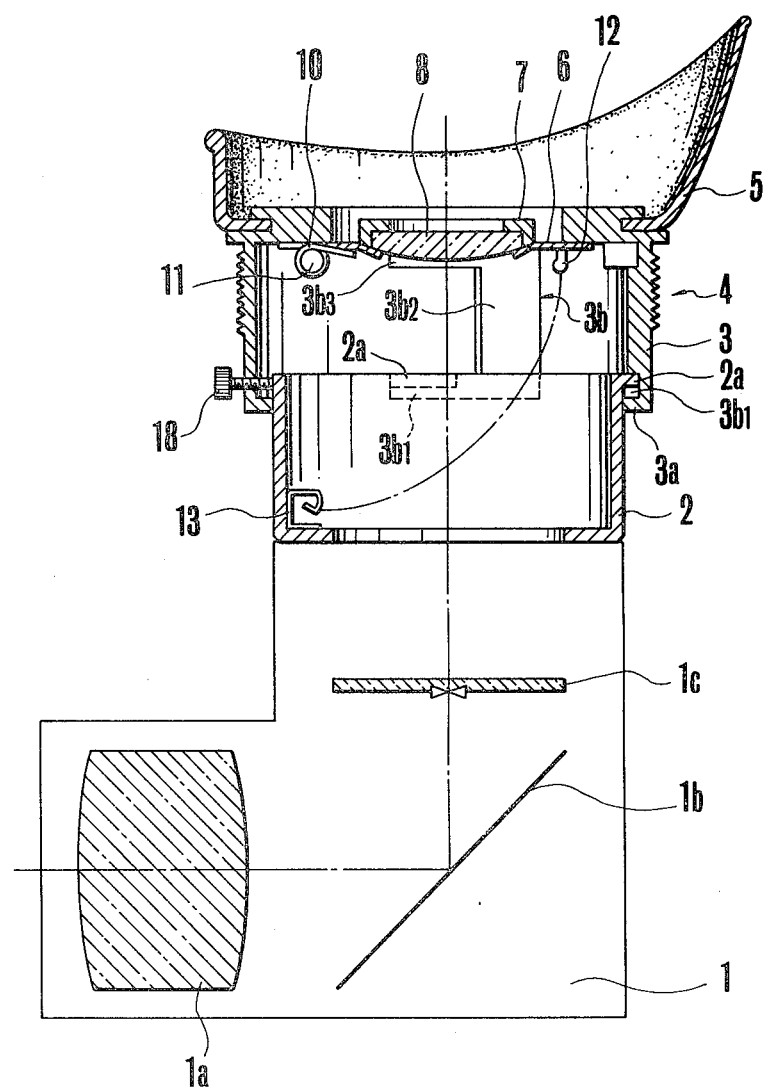
FIG. 2 is a sectional view of the device depicted in FIG. 1.

A hood 5 is mounted on the upper end of the second light shielding member 3 and a magnifying lens 8 serving as an eyepiece is secured to a supporting plate 6 through a fixing frame 7. The supporting plate 6 is secured to a shaft 11 which is rotatably carried by the second light shielding member 3, as also seen in FIG. 2. As best seen in FIG. 2, the shaft 11 is urged to rotate in a counterclockwise direction by a spring 10.

An operation knob 9 secured to the shaft 11 is provided to enable the shaft 11 to be rotated so as to effect pivotal movement of the supporting plate 6 and the magnifying eyepiece 8.

With reference to FIG. 2, there is shown a photography lens 1a with the camera being arranged so that light from an object to be photographed will pass through the lens 1a and will be reflected upwardly by a reflecting mirror 1b so as thereby to produce an image of the object on a reticle plate 1c. In detecting the focal length for the object to be photographed, the image of the object and the focusing plate 1c are observed in an enlarged view through the magnifying eyepiece 8.

Figure 3:
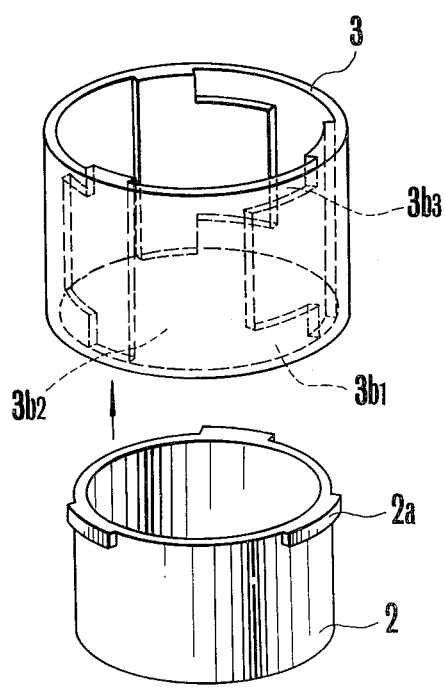
FIG. 3 is a perspective exploded view showing the light shielding tubular members of the viewfinder of the invention.

Formed along the upper end of the outer circumferential face of the first light shielding tubular member 2 are a plurality of guide claws 2a which are adapted to engage in a groove 3b formed in the inner circumference of the second light shielding member 3. As best seen in FIG. 3, the groove 3b consists of groove parts $3b_1$ and $3b_2$ which are arranged to stop sliding movement of the second light shielding tube 3 by engagement with the guide claws 2a. The part $3b_2$ is arranged to allow the second light shielding member 3 to slide therealong by the engagement with the guide claws 2a. Furthermore, at the lower end of the second light shielding tube 3 there is provided an inwardly directed flange 3a which is in close contact with the outer circumferential face of the first light shielding member 2 and which contributes to the light shielding effect which is provided as well as to maintaining the assembly dustproof while also exhibiting antifriction characteristics.

Provided on the lower end of each guide claw 2a is a plate spring (not shown) which is arranged to reduce play between the second light shielding tubular member 3 in the direction of the optical axis of the viewfinder when the guide claws 2a engage with the groove part $3b_1$ or with a groove part $3b_3$ of the groove 3b.

FIG. 2 shows the viewfinder in the state when it is in use. In order to convert the viewfinder from its usable state to a state where it is not in use, the knurled part 4 provided on the second light shielding tube 3 is first held by the operator and the second light shielding tube 3 is rotated counterclockwise relative to the optical axis of the viewfinder to bring the guide claw 2a to the part $3b_2$ of the groove 3b (see FIG. 3). Thereafter, the second light shielding member 3 is slidably moved along the guide claws 2a in order to have the first light shielding member 2 set within the second light shielding member 3. Subsequently, the second light shielding member 3 is rotated clockwise relative to the optical axis of the viewfinder until the guide claw 2a comes into engagement with the part $3b_3$ of the groove 3b. In order to bring the viewfinder from this state into a condition where it is in use, the aforementioned operation is carried out in reverse order. The second light shielding member 3 is rotated counterclockwise and is then pulled upwardly along the groove part $3b_2$ which is formed to extend in a vertical direction. At a point where the upward sliding movement is restrained, the second light shielding member 3 is then turned clockwise in order to arrange the viewfinder in its condition of use.

Provided on the free end side of the supporting plate 6 is a locking piece 12 which is arranged to engage a locking member 13 provided in the lower part of the first light shielding tube 2 when the supporting plate 6 is rotated clockwise by means of the operation knob 9. The locking member 13 is formed, for example, as a plate spring or the like having resilient characteristics in the direction of the viewfinder optical axis with the member 13 being free in the radial direction relative to the optical axis.

When the magnifying eyepiece 8 is not used for determining the composition of a picture of the image of an object to be photographed formed on the reticle plate 1c, the supporting plate 6 is rotated against the force of the spring 10 until the locking piece 12 and the locking member 13 come into engagement. The magnifying eyepiece 8 is then maintained in a state out of use by this engagement. In order to use the magnifying eyepiece 8, the operation knob may be again rotated in a reverse direction in order to disengage the locking piece 12 and the locking member 13 by causing deformation of the locking member 13. The supporting plate 6 is then permitted to rotate by means of the force of the spring 10 in order to set the magnifying eyepiece in the position illustrated.

Figure 4:
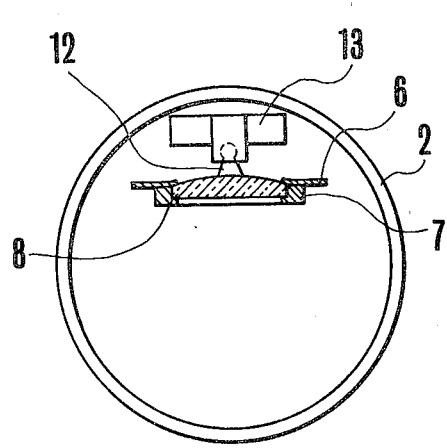
FIGS. 4 and 5 are top views showing the eyepiece of the viewfinder of the invention in different positions.
Figure 5:
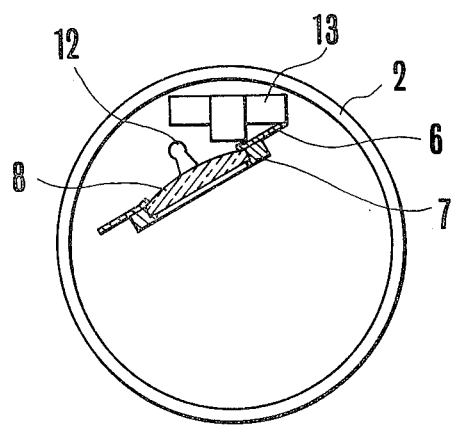

In cases where the viewfinder stowing operation is effected with the magnifying eyepiece in its out-of-use position, since the engagement between the locking piece 12 and the locking member 13 is releasable by rotation of the second light shielding tube 3, as shown in FIGS. 4 and 5, the urging force of the spring 10 causes the supporting plate 6 to rotate in order to keep the magnifying eyepiece in its in-use state when the second light shielding tube 3 is rotated about the viewfinder optical axis. Therefore, a stowing operation for the viewfinder may also be smoothly effected even under such a condition. Additionally, in the case of the embodiment shown in FIG. 2, a screw 18 is provided at the second light shielding tube 3 in order to permit fixing of the second light shielding tube 3 relative to the first tube 2 halfway along its path of sliding movement. This enables the operator of the camera to determine the position for the magnifying eyepiece 8 at a point suitable for diopter by adjusting the length of the optical path from the focusing plate 1c to the magnifying lens 8.

Figure 6:
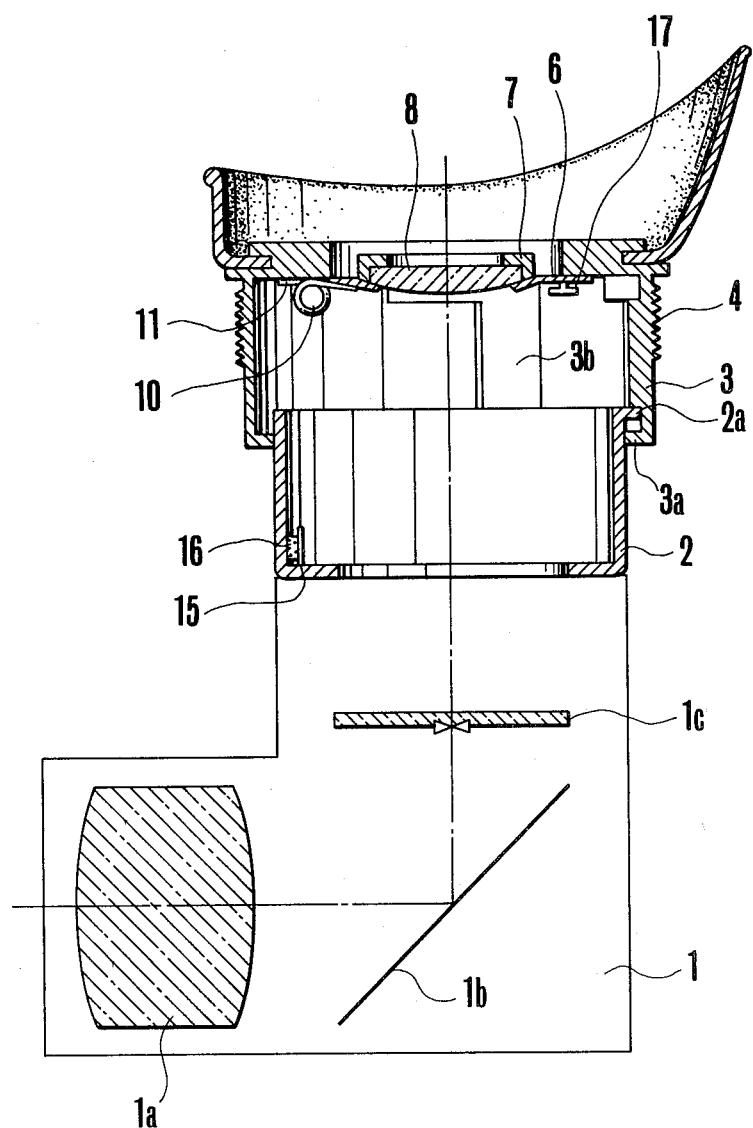
FIG. 6 is a sectional view showing another embodiment of the invention.

Another embodiment of the invention is depicted in FIG. 6. In this embodiment, magnetic means are used as the locking or holding means for the eyepiece unit. As shown in FIG. 6, elements which are the same as elements shown in the embodiment previously described in connetion with FIG. 2 are identified by the same reference numerals. A magnetic body 15 which is composed of an iron member or the like is attached to the lower part of the first light shielding tube 2 through an elastic member 16 which may be composed of soft foamed urethane. A magnet 17 is arranged so as to attract the magnetic body 15. When the supporting plate 6 is rotated against the force of the spring 10 by means of the operation knob 9, the magnetic body 15 will be attracted by the magnet 17 in order to keep the supporting plate 6 and the magnifying eyepiece 8 in its position out of use. The elastic member 16 is provided in order to bring the magnetic body 15 and the magnet 17 into interfacing contact. In the embodiment of FIG. 6, with the magnifying lens or eyepiece 8 in its out-of-use position, the second light shielding tube 3 is rotated on the viewfinder optical axis. As a result of this rotation, the contacting area between the magnetic body 15 and the magnet 17 will be decreased until the attracting force of the magnet 17 diminishes and becomes smaller than the urging force of the spring 10. As a result, the supporting plate 6 will be released from the holding action of the magnet 17. The supporting plate 6 is then turned by the force of the spring 10 and the magnifying lens 8 will be brought to its in-use position. Thereafter, the stowing operation for the viewfinder may be effected without difficulty.

Thus, as will be seen in accordance with the foregoing description, the waist level viewfinder according to the present invention is arranged with the light shielding means thereof formed by a plurality of slidable light shielding tubes. Despite the highly simplified structural arrangement provided, the waist level viewfinder nevertheless offers excellent features, both from the point of view of portability and light shielding capability. The distance between the focusing plate and the magnifying lens is variable as desired and therefore, in accordance with a very advantageous feature of the invention, diopter can be corrected. The provision of the holding means for holding the magnifying lens in its unused position in combination with the arrangement for releasing the lens from the holding means in association with a stowing operation on the viewfinder enables the operator to bring the viewfinder into its stowed position always by means of the same stowing operation irrespective of whether the magnifying lens is in the held position or not. Operability of the viewfinder is therefore improved by the arrangement in accordance with the invention.

Although the waist level viewfinder of the invention comprises two light shielding tubes in each of the aforementioned embodiments, it should be understood that the invention is not limited to such an arrangement of these specific embodiments but that the light shielding part of the viewfinder may be formed differently, for example, with three or more light shielding tubes.

While specific embodiments of the invention have been shown and described in detail to illustrate the application of the inventive principles, it will be understood that the invention may be embodied otherwise without departing from such principles.

What is claimed is:

1. A viewfinder for a camera defining an optical axis and including a focusing plate adapted to permit from above said focusing plate direct observation on said focusing plate of the image of an object to be photographed, comprising:

first light shielding means having a tubular shape installed in said camera;

second light shielding means having a tubular shape slidably fitted in the direction of said optical axis relative to said first light shielding means while at the same time being freely rotatable around said optical axis, said second light shielding means being changed over by rotation about said optical axis between a first state where sliding is enabled to a second state where sliding is prevented; and eyepiece means provided at said second light shielding means.

2. A viewfinder according to claim 1 wherein rotation of said second light shielding means to place said second light shielding means from said first state to said second state operates to place said viewfinder, respectively, in a position where it is out of use and at a second position where it is in use.

3. A viewfinder for a camera defining an optical axis and including a focusing plate adapted to permit from above said focusing plate direct observation on said focusing plate of the image of an object to be photographed, comprising:

first light shielding means having a tubular shape installed in said camera;

second light shielding means having a tubular shape slidably fitted in the direction of said optical axis relative to said first light shielding means and at the same time being freely rotatable around said optical axis, said second light shielding means being changed over by said rotating action between a first state where sliding is enabled and a second state where sliding is prevented;

eyepiece means provided at said second light shielding means capable of being changed over between a first state which is set when said focusing plate is viewed through said eyepiece means and a second state which is set when said eyepiece means is not in use; and holding means for keeping said eyepiece in said second state, said holding means being operative to release said eyepiece in correspondence with rotating action of said second light shielding means to place said second light shielding means in said first state thereby to return said eyepiece to said first state.

4. A viewfinder according to claim 3 wherein said holding means is disposed at said first light shielding means.

5. A viewfinder according to claim 4 wherein said holding means is formed with a plate spring.

6. A viewfinder according to claim 4 wherein said holding means is formed with a permanent magnet.

7. A viewfinder for a camera defining an optical axis and including a focusing plate adapted to permit from above said focusing plate direct observation on said focusing plate of the image of an object to be photographed, comprising:

first light shielding means having a tubular shape installed in said camera and provided with protrudent members which are disposed on an outer circumferential face of said first light shielding means;

second light shielding means having a tubular configuration slidably fitted on said first light shielding means for movement relative thereto in the direction of said optical axis, said second light shielding means having a groove which consists of a guide part arranged to guide said protrudent members in the direction of the optical axis of said viewfinder and engaging parts arranged to engage said protrudent members to prohibit shifting thereof in the direction of said optical axis;

eyepiece means supported on said second light shielding means;

urging means for urging said eyepiece means to confronting relationship with said focusing plate;

operation means for retracting said eyepiece means from the position in which said eyepiece means confronts said focusing plate; and holding means for keeping said eyepiece means in said retracted position thereof, said holding means being arranged to release said eyepiece means from the holding action of said holding means when the engagement between said protrudent members and said engaging part of said groove is released by rotation of said second light shielding means.

* * * * *